(12) United States Patent
Coccia et al.

(10) Patent No.: US 7,600,467 B2
(45) Date of Patent: Oct. 13, 2009

(54) AUTOMATIC APPARATUS FOR HEATING AND FROTHING MILK

(75) Inventors: Andrea Coccia, Binasco Milano (IT); Dario Sala, Binasco Milano (IT)

(73) Assignee: Gruppo Cimbali S.p.A., Binasco Milano (IT)

( * ) Notice: Subject to any disclaimer, the term of this patent is extended or adjusted under 35 U.S.C. 154(b) by 74 days.

(21) Appl. No.: 11/598,237

(22) Filed: Nov. 13, 2006

(65) Prior Publication Data

US 2007/0107603 A1   May 17, 2007

(30) Foreign Application Priority Data

Nov. 11, 2005  (EP) .................................. 05425793

(51) Int. Cl.
*A47J 31/00*   (2006.01)
(52) U.S. Cl. ........................... 99/293; 99/453; 99/323.1
(58) Field of Classification Search ........... 99/279–323, 99/452–455, 483, 323.1, 323.3, 495, 516; 261/72.1, 66
See application file for complete search history.

(56) References Cited

U.S. PATENT DOCUMENTS

| | | | | |
|---|---|---|---|---|
| 4,949,631 | A * | 8/1990 | Fregnan | 99/452 |
| 4,960,042 | A * | 10/1990 | Grossi | 99/293 |
| 5,473,972 | A * | 12/1995 | Rizzuto et al. | 99/290 |
| 5,738,002 | A * | 4/1998 | Marano-Ducarne | 99/293 |
| 6,006,654 | A * | 12/1999 | Pugh | 99/293 |
| 6,499,389 | B1 * | 12/2002 | Probst | 99/323.1 |
| 6,561,079 | B1 * | 5/2003 | Muller et al. | 99/282 |
| 6,713,110 | B2 * | 3/2004 | Imboden et al. | 426/511 |
| 7,021,206 | B2 * | 4/2006 | Eckenhausen et al. | 99/452 |
| 2005/0118319 | A1 | 6/2005 | Green et al. | |

(Continued)

FOREIGN PATENT DOCUMENTS

EP   0 919 176   6/1999

(Continued)

OTHER PUBLICATIONS

European Search Report for EP 05 42 5793 dated Feb. 27, 2006.

*Primary Examiner*—Timothy F. Simone
(74) *Attorney, Agent, or Firm*—Nixon & Vanderhye, PC

(57) ABSTRACT

Automatic apparatus for treating milk by means of steam comprises a steam-generating source, a reservoir containing the milk to be treated, a mixing chamber into which a flow of milk with a predetermined flow-rate and at least one flow of steam with a predetermined flow-rate are brought through respective ducts opening into the mixing chamber, the chamber being provided with an opening for the delivery of the mixture produced, as well as a peristaltic pump operating on the milk duct between the reservoir and the chamber and driven by an electric motor with adjustable speed. The flow-rate of the pump and consequently the ratio between the flow of milk and the flow of steam can thus be varied so as to achieve the desired temperature in the final product. The apparatus includes an air source, a respective duct connecting the air source to the mixing chamber in order to bring a predetermined air-flow thereto, and a milk frothing chamber disposed downstream of the mixing chamber and in communication therewith, and having an opening for the delivery of the product which, in the case in question, is heated and frothed milk.

8 Claims, 1 Drawing Sheet

U.S. PATENT DOCUMENTS

2005/0172833 A1 8/2005 Ioannone et al.
2007/0089611 A1* 4/2007 Coccia et al. ............ 99/275
2007/0089612 A1* 4/2007 Coccia et al. ............ 99/279

FOREIGN PATENT DOCUMENTS

JP 2007130480 A * 5/2007
WO 97/27793 8/1997

* cited by examiner

AUTOMATIC APPARATUS FOR HEATING AND FROTHING MILK

This application is a new US patent application claiming priority to EP 05425793.6, dated 11 Nov. 2005, the entire content of which is hereby incorporated by reference.

BACKGROUND OF THE INVENTION

1. Field of the Invention

The present invention relates to an automatic apparatus for treating milk with steam.

2. Background of the Invention

The apparatus comprises a steam source, a reservoir containing the milk to be treated, a mixing chamber into which a flow of milk with a predetermined flow-rate and at least one flow of steam with a predetermined flow-rate are brought through respective ducts opening into the chamber, as well as a peristaltic pump operating on the milk duct between the reservoir and the chamber.

In particular, the treatment to which the milk is subjected is heating to a predetermined temperature such as to render the milk suitable for use as a hot drink or to be added to coffee to make a drink known as "caffelatte".

Moreover, the treatment also includes an operation to froth the heated milk with air so as to produce milk with a creamy froth suitable for making drinks based on "espresso" coffee and known as "cappuccinos".

DESCRIPTION OF RELATED ART

The development of the market for espresso coffee and coffee-based drinks has led to an ever increasing need to provide apparatuses for the automatic preparation of purely heated or heated and frothed milk.

According to a known technique described, for example in EP 0 195 750, the automatic heating and frothing of the milk is based on the utilization of the kinetic and thermal energy of the steam that is generated in the boiler of the machine for the preparation of the coffee.

According to this known technique, the kinetic energy of the steam which is condensed to bring about the heating is also used to perform the work of drawing the milk from the reservoir and heating and frothing it with a device based on the Venturi effect.

However, the conceptual simplicity of this technique is accompanied by several drawbacks connected with the nature of the fluids involved. In a device operating by the Venturi effect to heat and froth the milk as well as to draw it from the reservoir, physical transformations in fact occur so that, whilst the kinetic energy of the steam draws along a flow of milk, the steam condenses upon contact with the milk giving up latent heat and contracting in volume to the extent that it condenses. At the same time, the air, which is also drawn in by the Venturi effect in order to form the froth of the milk, is mixed with the milk and the steam upon entering the chamber in which the frothing process takes place and expands as it is heated.

The combination of these phenomena of contraction and expansion of the components of the mixture consequently renders automatic control of the device complex and difficult, especially when it is desired to control the final temperature of the frothed milk and the quality and quantity of the froth.

If the need to automate the cleaning, washing and disinfection of the various components of the apparatus that are involved in the passage of the milk is also taken into account, the conclusion is reached that the above-described known technique presents many serious drawbacks in its application to automatic machines and is also very expensive because of the structural and functional complications that are necessary to try to overcome those drawbacks.

According to another known technique described, for example, in EP 0 157 069, a pump is used to bring about the flow of milk from the holding reservoir to a treatment chamber forming part of a Venturi-effect device in which the milk is heated and optionally also frothed.

The pump in particular may also be of the reversible peristaltic type as indicated, for example, in GB-A-2 160 172 and in WO 2005/013781 A1.

Some of the limitations imposed by Venturi-based devices can thus be overcome but the problem of controlling the temperature of the heated milk and, in the case of milk that is also frothed, the quality and quantity of the froth, remains unsolved.

BRIEF SUMMARY OF THE INVENTION

The object of the present invention is to overcome the drawbacks of the known techniques and to produce heated milk by means of an automatically operating apparatus with the capability to control and regulate the temperature of the milk delivered.

A further object of the present invention is to produce heated and frothed milk with control of the temperature and of the quality and quantity of froth of the product delivered.

BRIEF DESCRIPTION OF THE DRAWING

The invention will now be described in greater detail with reference to the appended drawing in which.

DETAILED DESCRIPTION OF THE INVENTION

Figure 1:
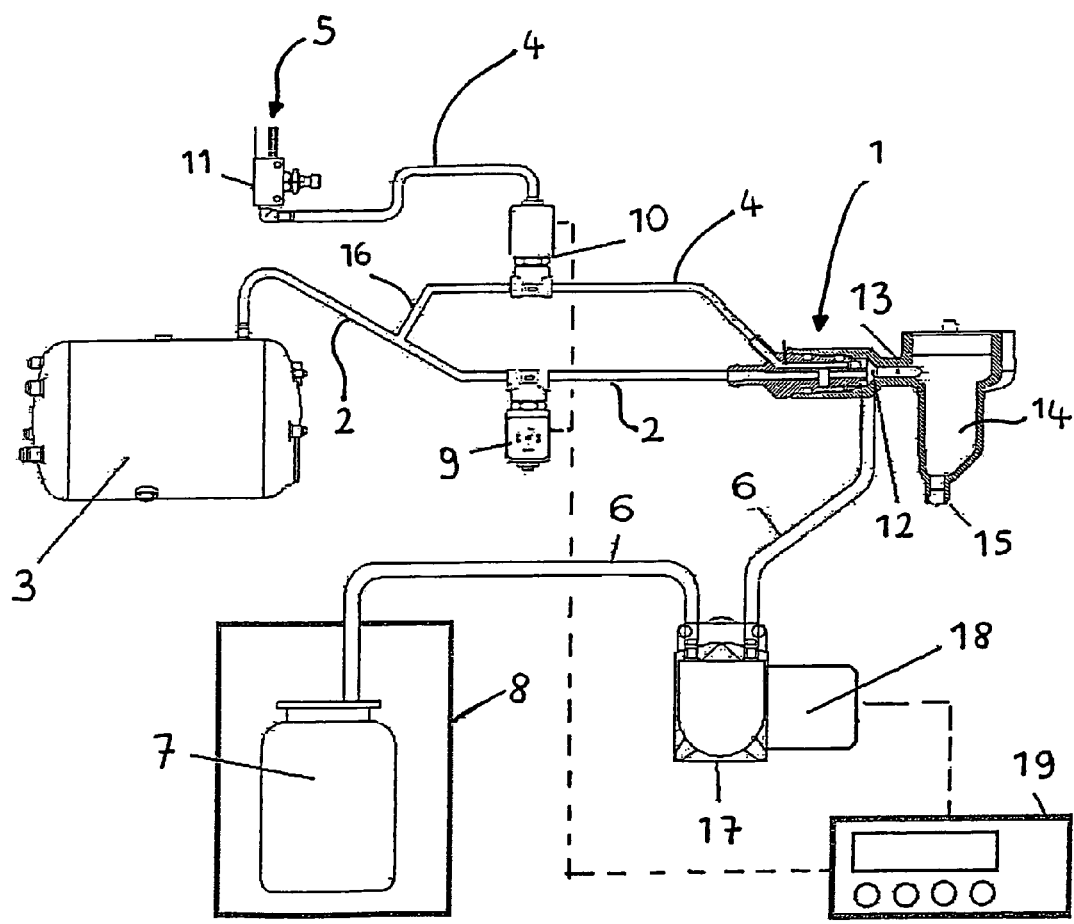
FIG. 1 shows schematically a preferred but not exclusive embodiment of the automatic apparatus for heating and frothing milk.

With reference to the drawing, reference numeral 1 indicated a conventional Venturi-effect device which is reached by a duct 2 for supplying the steam generated in a boiler 3, a duct 4 for air coming from a source 5, as well as a duct 6 for milk coming from a reservoir 7 which is turn is housed in a refrigerating container 8.

A first solenoid valve 9 is inserted in the steam duct 2 and a second further solenoid valve 10 is inserted in the air duct 4.

A flow regulator 11 is also provided in the latter duct 4.

The Venturi-effect device 1 has a mixing chamber 12 with an opening 13 which puts it into communication with a milk frothing chamber 14.

This latter chamber is also provided with a product-delivery opening 15.

A further duct 16 connects the steam source 3 with the solenoid valve 10, for reasons which will become clear from the following description.

According to the invention, a peristaltic pump 17, driven by an electric motor 18, is inserted in the milk duct 6.

The electric motor 18 is of the type with adjustable speed in both directions of rotation.

Also according to the invention, the apparatus comprises a central control unit 19 for the electronic control both of the motor 18 and of the solenoid valves 9 and 10.

In particular, the central control unit 19 comprises a microprocessor which can adjust the rate of rotation of the electric motor 18, and hence of the peristaltic pump 17, both in one direction and in the opposite direction, so as to adjust the rate of the flow of milk that is drawn from the reservoir 7 and sent to the mixing chamber 12 of the Venturi-effect device 1.

According to the invention, the suction effect in the chamber 12 of the device 1 which is brought about by the flow of steam as a result of the opening of the solenoid valve 9 is therefore limited to the air that passes through the duct 4 when the solenoid valve 10 is opened and the milk is also to be frothed and is not purely to be heated, in which case the solenoid valve 10 remains closed.

The frothing takes place in known manner in the chamber 14 when the mixture of milk, steam and air reaches that chamber.

According to the invention, therefore, the flow of milk is not caused by the suction conditions brought about in the chamber 12 by the flow of steam but is caused by the peristaltic pump 17.

This pump, which is driven at an adjustable speed by the motor 18, urges the milk along the duct 6 into the chamber 12 of the device 1 in a controlled and uniform manner, preventing any possibility of backflow.

Variation of the speed of the motor 18 varies the flow-rate of the pump 17 and the ratio between the flow-rates of milk and of steam is thus adjusted.

The desired temperature for the final product can thus be programmed in the central control unit 19 without risk of malfunction or instability.

As an alternative to the suction of the air brought about by the flow of steam in the device 1 by the Venturi effect, when air is required for the frothing of the milk, it may be supplied, by opening of the solenoid valve 10, in the form of a continuous flow coming from a compressed-air source, for example, a compressor, or in the form of a series of pressure pulses of controlled duration.

The peristaltic pump 17 also ensures safe drainage of the milk back towards the refrigerated reservoir 7, irrespective of the positioning of the branches of the duct 6 relative to the force of gravity, by virtue of the reversibility of the motor 18 and of the pump 17.

In fact, upon completion of a delivery of heated and/or frothed milk, it suffices to reverse the rotation of the motor 18 for a short time, typically a few seconds, in order to draw all of the milk remaining upstream of the mixing chamber 12 back into the reservoir 7; at the same time, after the conductivity of the solenoid valve 10 in the duct 16 coming from the boiler 3 has been switched, a moderate flow of steam coming from the duct 4 cleans the device 1, urging the residual hot milk towards the delivery opening 15.

According to the invention, it is therefore possible to achieve temperatures in the heated or heated and frothed milk which approach those that can typically be achieved with manual heating and frothing in a jug under the steam nozzle of a conventional coffee machine, that is temperatures of about 80° C., rather than temperatures of only about 65° C. which can be reached with automatic apparatus of the prior art.

We claim:

1. An automatic apparatus for treating milk by means of steam, the
apparatus comprising:
a steam-generating source,
a reservoir containing the milk to be treated,
a mixing chamber,
a milk duct connecting said milk reservoir to said mixing chamber,
a peristaltic pump operating on said milk duct for bringing a
milk flow at a predetermined flow-rate to said mixing chamber,
an electric motor, with adjustable speed, being connected to
said peristaltic pump to drive the same,
a steam duct connecting said steam-generating source to said
mixing chamber,
a first solenoid valve on said steam duct,
said steam-generating source providing a steam flow at a predetermined flow-rate to said mixing chamber through said steam duct,
a delivery opening provided in said mixing chamber,
a central control unit with at least one microprocessor having functions, obtainable by means of dedicated buttons, at least for adjusting a rate of rotation of said electric motor and hence for adjusting the flow-rate of the peristaltic pump according to the temperature to be adopted by the flow of milk in the mixing chamber as a result of the admission of the predetermined flow of steam through said first solenoid valve.

2. An automatic apparatus for treating milk by means of steam, the
apparatus comprising:
a steam-generating source,
a reservoir containing the milk to be treated,
a mixing chamber,
a milk duct connecting said milk reservoir to said mixing chamber,
a peristaltic pump operating on said milk duct for bringing a
milk flow at a predetermined flow-rate to said mixing chamber,
an electric motor, with adjustable speed, being connected to
said peristaltic pump to drive the same,
a steam duct connecting said steam-generating source to said
mixing chamber,
a first solenoid valve on said steam duct,
said steam-generating source providing a steam flow at a predetermined flow-rate to said mixing chamber through said steam duct,
a delivery opening provided in said mixing chamber,
an air source,
an air duct connecting said air source to said mixing chamber,
a second solenoid valve on said air duct,
a milk frothing chamber located downstream of said mixing
chamber and connected thereto by said delivery opening of the
mixing chamber,
a product delivery opening in said frothing chamber,
a central control unit with at least one microprocessor having functions, obtainable by means of dedicated buttons, at least for adjusting a rate of rotation of said electric motor and hence for adjusting a flow-rate of the peristaltic pump according to the temperature to be adopted by the flow of milk in the mixing chamber as a result of the admission of the predetermined flow of steam through said first solenoid valve.

3. An automatic apparatus for treating milk according to claim 2, wherein said air source provides an air flow at a predetermined flow-rate to said mixing chamber through said air duct and said second solenoid valve, resulting in heating and frothing of the milk.

4. An automatic apparatus for treating milk according to claim 1 wherein the treatment is constituted by heating the milk to a predetermined temperature.

5. An automatic apparatus for treating milk according to claim 1, wherein the microprocessor for controlling the electric motor of the peristaltic pump disposed in the duct for the supply of the milk to the mixing chamber, further comprises the function of reversal of the direction of rotation of the motor.

6. An automatic apparatus for treating milk according to claim 2, wherein the air flow for the frothing of the milk reaches the mixing chamber by suction brought about by the flow of steam through a device by the Venturi effect, said device being located on the steam duct.

7. An automatic apparatus for treating milk according to claim 2, wherein the air flow for frothing the milk reaches the mixing chamber in the form of a continuous pressurized flow.

8. An automatic apparatus for treating milk according to claim 2, wherein the air flow for frothing the milk reaches the mixing chamber in the form of pulses of regulated duration.

* * * * *